US008549836B2

(12) United States Patent
Maus et al.

(10) Patent No.: US 8,549,836 B2
(45) Date of Patent: Oct. 8, 2013

(54) METHOD FOR OPERATING AN EXHAUST SYSTEM, EXHAUST SYSTEM AND VEHICLE HAVING AN EXHAUST SYSTEM

(75) Inventors: Wolfgang Maus, Bergisch Gladbach (DE); Rolf Brück, Bergisch Gladbach (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 97 days.

(21) Appl. No.: 13/217,321

(22) Filed: Aug. 25, 2011

(65) Prior Publication Data
US 2012/0006007 A1 Jan. 12, 2012

Related U.S. Application Data

(63) Continuation of application No. PCT/EP2010/051664, filed on Feb. 10, 2010.

(30) Foreign Application Priority Data

Feb. 25, 2009 (DE) .................. 10 2009 010 517

(51) Int. Cl.
*F01N 3/00* (2006.01)
(52) U.S. Cl.
USPC ................................ 60/277; 60/273; 60/274
(58) Field of Classification Search
USPC ...................... 60/274–295; 436/37
See application file for complete search history.

(56) References Cited

U.S. PATENT DOCUMENTS

| 6,658,841 B2 * | 12/2003 | Beer et al. ................. 60/286 |
| 6,739,176 B2 | 5/2004 | Neuhausen et al. |
| 7,134,273 B2 * | 11/2006 | Mazur et al. ............... 60/286 |
| 2002/0144501 A1 * | 10/2002 | Uedahira et al. .......... 60/278 |
| 2007/0298504 A1 | 12/2007 | Mueller et al. |

FOREIGN PATENT DOCUMENTS

| EP | 1 136 671 A1 | 9/2001 |
| EP | 1 712 764 A1 | 10/2006 |
| WO | 2008/002907 A2 | 1/2008 |

OTHER PUBLICATIONS

International Search Report of PCT/EP2010/051664, Dated Apr. 14, 2010.

* cited by examiner

*Primary Examiner* — Thomas Denion
*Assistant Examiner* — Philip Eklem
(74) *Attorney, Agent, or Firm* — Laurence A. Greenberg; Werner H. Stemer; Ralph E. Locher

(57) ABSTRACT

A method for operating an exhaust system including at least one oxidation catalytic converter, at least one configuration for selective catalytic reduction and at least one measuring probe for determining the effectiveness of the configuration, includes at least determining a conversion effectiveness of the configuration using the at least one measuring probe and calculating an effectiveness of nitrogen monoxide conversion in the oxidation catalytic converter from the determined conversion effectiveness. In this way, an estimate of the effectiveness of the nitrogen monoxide conversion to nitrogen dioxide of an oxidation catalytic converter in the exhaust system can be obtained without additional measuring probes in or on the oxidation catalytic converter. This reduces the maintenance frequency of the exhaust gas system and at the same time enables precise regulation of the exhaust gas conversion as a whole. An exhaust system and a vehicle having an exhaust system are also provided.

7 Claims, 1 Drawing Sheet

METHOD FOR OPERATING AN EXHAUST SYSTEM, EXHAUST SYSTEM AND VEHICLE HAVING AN EXHAUST SYSTEM

CROSS-REFERENCE TO RELATED APPLICATION

This is a continuation, under 35 U.S.C. §120, of copending International Application No. PCT/EP2010/051664, filed Feb. 10, 2010, which designated the United States; this application also claims the priority, under 35 U.S.C. §119, of German Patent Application DE 10 2009 010 517.4, filed Feb. 25, 2009; the prior applications are herewith incorporated by reference in their entirety.

BACKGROUND OF THE INVENTION

Field of the Invention

The invention relates to a method for operating an exhaust system having at least one oxidation catalytic converter and at least one configuration which is suitable for selective catalytic reduction. The invention also relates to an exhaust system and a vehicle having an exhaust system.

Exhaust systems which contain not only an oxidation catalytic converter but also a configuration suitable for a selective catalytic reduction, are used in particular for motor vehicles which, due to the particular combustion conditions in their internal combustion engines, have especially high emissions of nitrogen oxide compounds. Those are typically motor vehicles having internal combustion engines which operate with a lean mixture. In internal combustion engines of that type, the lambda value is greater than 1. That means that the fuel which is supplied to the internal combustion engine is not sufficient for a complete conversion of the oxygen in the combustion chamber. Internal combustion engines of that type are distinguished, in particular, by fuel consumption advantages.

Exhaust-gas purification configurations, which are suitable for a selective catalytic reduction of nitrogen oxide compounds, conventionally contain a supply device, provided in the exhaust line, for reducing agents or reducing agent precursors, and a catalytic reactor provided downstream in the exhaust-gas flow direction. Ammonia, which is gained from the precursor urea, is normally used as a reducing agent. The urea is supplied in aqueous solution, or if appropriate in solid form, to the exhaust gas and is converted to ammonia by hydrolysis and/or thermolysis. An aqueous urea solution is available, for example, under the trade name AdBlue. The catalytic reactor (usually a catalytically coated honeycomb body) serves to convert the nitrogen oxide compounds ($NO_X$) in the exhaust gas, with the reducing agent, to form non-harmful substances. Normally, nitrogen, oxygen and water are generated as products during the selective catalytic reduction.

Exhaust systems which have such a configuration for selective catalytic reduction often additionally contain an oxidation catalytic converter which is suitable for the reduction of other pollutants contained in the exhaust gas, such as for example hydrocarbons (HC) and/or soot particles (C) and/or carbon monoxide (CO). The oxidation catalytic converter is often disposed upstream of the configuration for selective catalytic reduction or upstream of the reducing agent supply device, as viewed in the exhaust-gas flow direction. In that position, the oxidation catalytic converter can be utilized to prepare the exhaust gases of the internal combustion engine for the treatment which takes place downstream in the configuration for selective catalytic reduction. For that purpose, the oxidation catalytic converter converts, for example, nitrogen oxide (NO) contained in the exhaust gas into nitrogen dioxide ($NO_2$). Unburned carbon compounds (C) are additionally oxidized in that case.

Exhaust systems of that type have for some time now been widely used in the field of trucks, because trucks are typically driven by internal combustion engines which operate with a lean mixture. With regard to future exhaust-gas standards, however, such exhaust systems will become ever more important in the field of passenger motor vehicles as well.

It is conventional for operating parameters of the exhaust system to be determined as input variables for the engine controller. That generally takes place through the use of measurement probes located in the exhaust system. The injection of fuel into the internal combustion engine, the air supply and if appropriate the ignition time of the mixture in the internal combustion engine, may then also be adapted to the conditions in the exhaust system, as a result of which the mode of operation of the exhaust system can be adapted and the pollutant emissions further reduced. Measurement probes of that type in the exhaust system are possible fault sources because the measurement values provided by them are imprecise, and cannot be correspondingly interpreted, for example in the event of contamination of the measurement probe. For those reasons, measurement probes in exhaust systems must be regularly checked or monitored. At the same time, such measurement probes, in particular gas measurement probes, constitute a considerable cost factor in the production of exhaust systems. For that reason, it is desirable for the fewest possible measurement probes for recording operating parameters to be provided in an exhaust system, and at the same time to be able to provide all the relevant information regarding the state of the exhaust system. Furthermore, the options presently known from the prior art for determining the state of an oxidation catalytic converter in an exhaust system are inadequate or too imprecise.

SUMMARY OF THE INVENTION

It is accordingly an object of the invention to provide a method for operating an exhaust system, an exhaust system for executing the method and a correspondingly equipped vehicle having an exhaust system, which overcome the hereinafore-mentioned disadvantages and at least partially solve the highlighted problems of the heretofore-known methods, systems and vehicles of this general type. It is, in particular, an object to specify a method for operating an exhaust system having a configuration for selective catalytic reduction and having an oxidation catalytic converter, in which method parameters required for regulation of the exhaust system, in particular parameters for the diagnosis of the oxidation catalytic converter, can be determined and at the same time a minimum number of measurement probes is required.

With the foregoing and other objects in view there is provided, in accordance with the invention, a method for operating an exhaust system of a mobile internal combustion engine. The method comprises providing at least one oxidation catalytic converter, providing at least one configuration for selective catalytic reduction, providing at least one measurement probe for determining effectiveness of the configuration, a) determining a conversion effectiveness of the configuration by using the at least one measurement probe; and
b) calculating an effectiveness of nitrogen monoxide conversion in the oxidation catalytic converter from the determined conversion effectiveness.

The conversion effectiveness of a configuration for selective catalytic reduction, which is also referred to hereinafter as an SCR configuration, is highly dependent on the ratio of nitrogen dioxide to nitrogen monoxide in the exhaust gas which is to be purified in the configuration. That ratio is determined significantly by the oxidation catalytic converter which is disposed upstream of the SCR configuration in the flow direction. The oxidation catalytic converter converts nitrogen monoxide to nitrogen dioxide. In particular, if further factors which influence the conversion effectiveness of the SCR configuration are known or have such a small influence that they can be disregarded, it is possible from the conversion effectiveness of the SCR configuration to very reliably and precisely calculate the effectiveness of the conversion of nitrogen monoxide to nitrogen dioxide in the oxidation catalytic converter. The information regarding the effectiveness of the nitrogen monoxide conversion of the oxidation catalytic converter is thus obtained without a measurement probe assigned to the oxidation catalytic converter. In this case, "nitrogen monoxide conversion" means, in particular, the conversion of nitrogen monoxide to form nitrogen dioxide.

The expression "measurement probes" means, in particular, gas probes. Measurement probes for measuring the conversion effectiveness of the SCR configuration are generally so-called NOx sensors. These are in part also suitable for determining a lambda value. Use is typically made of planar probes, resistance-jump probes and/or wideband probes. In the exhaust system used for the method according to the invention, it is preferable for no measurement probes assigned to the oxidation catalytic converter to be provided. In particular, only one NOx sensor is provided downstream of the SCR configuration. Sensors for determining other parameters such as pressure, temperature and/or volume flow may optionally be provided so as to be assigned both to the SCR configuration and also to the oxidation catalytic converter.

The information regarding the effectiveness of the oxidation catalytic converter may, for example, be used for regulating a heating element provided in the exhaust system, for regulating the internal combustion engine and/or for checking a need for regeneration of the oxidation catalytic converter. In an internal combustion engine, it is possible for example, for the fuel or oxygen supply and/or if appropriate the ignition time to be adapted by taking the information determined into consideration.

The conversion effectiveness of the SCR configuration may, for example, also be determined through the use of two measurement probes, wherein as viewed in the flow direction of the exhaust gas, one measurement probe is disposed at the start and one measurement probe is disposed at the end of the SCR configuration in the exhaust system, and the change in the fraction of nitrogen oxide compounds in the exhaust gas is determined by measuring the difference in the nitrogen oxide compound content before and after the selective catalytic reduction.

In accordance with another mode of the invention, the method for operating an exhaust system is furthermore advantageous if a characteristic map stored in an evaluation circuit is used for the execution of step b).

Aside from the conversion effectiveness in the oxidation catalytic converter, further parameters may also have an influence on the conversion effectiveness of the SCR configuration. Possible parameters may be determined, and stored as a characteristic map, in a test set-up in which the conversion effectiveness in the oxidation catalytic converter is measured and not calculated. It is possible for the conversion effectivenesses in the oxidation catalytic converter measured in the test set-up to then be simply and reliably reconstructed in mass-produced exhaust systems from such an empirically determined characteristic map.

In accordance with a further mode of the invention, the method is particularly advantageous if, after step b), the conversion effectiveness of the oxidation catalytic converter for hydrocarbons and/or for carbon monoxide is calculated from the effectiveness of the nitrogen monoxide conversion. There is a relationship between the conversion effectivenesses of an oxidation catalytic converter for the three most important pollutant types (nitrogen oxide compounds, hydrocarbons and carbon monoxide). If one of the conversion effectivenesses is known, it is possible through the use thereof to draw conclusions regarding the other two conversion effectivenesses. A characteristic map in which empirically determined relationships are stored is suitable in this case too.

In accordance with an added mode of the invention, in a refinement of the method, at least one spatial velocity and/or a volume flow of the exhaust gas is measured in the exhaust system and incorporated in the calculation of the effectiveness of the nitrogen monoxide conversion in the oxidation catalytic converter.

Aside from the conversion effectiveness in the oxidation catalytic converter, the spatial velocity of the exhaust gas or the volume flow of the exhaust gases through the exhaust system is a further important influential variable on the conversion effectiveness of the SCR configuration. It is therefore advantageous for a present spatial velocity and/or a volume flow of the exhaust gas to additionally be incorporated in the calculation of the effectiveness of the nitrogen monoxide conversion in the oxidation catalytic converter. The volume flow and/or spatial velocity may, if appropriate, also be stored as influential parameters in the characteristic map.

In accordance with an additional mode of the invention, it is also advantageous for at least one temperature of the exhaust gases to be measured in the exhaust system and incorporated in the calculation of the effectiveness of the nitrogen monoxide conversion in the oxidation catalytic converter. The temperature of the exhaust gases is also an important influential parameter on the conversion effectiveness in the SCR configuration, and it may be expedient for the temperature to also be taken into consideration in a characteristic map. The temperature may, for example, be measured in and/or on the SCR catalytic converter or in and/or on an exhaust line in the SCR configuration.

The dependency of the conversion effectiveness of an SCR configuration on the ratio of nitrogen dioxide to nitrogen monoxide is particularly pronounced at low exhaust-gas temperatures, in particular in the range from 150° C. to 300° C. The method according to the invention may therefore be used, in particular, when a temperature of the exhaust gas is between 150° C. and 300° C. The temperature may be measured, for example, in the SCR configuration. The method according to the invention yields particularly precise results in that temperature range.

In accordance with yet another mode of the invention, it may be advantageous if, in the method according to the invention, an amount of reducing agent or reducing agent precursor supplied to the exhaust gas is determined (calculated and/or measured) and incorporated in the calculation of the effectiveness of the nitrogen monoxide conversion in the oxidation catalytic converter. If appropriate, it is also possible, instead of a measurement of the supplied reducing agent quantity, for a regular check of the filling level of a reducing agent vessel and/or of a tank for reducing agent precursor to be carried out.

With the objects of the invention in view, there is also provided an exhaust system for a mobile internal combustion engine. The exhaust system comprises at least one oxidation catalytic converter, at least one configuration for selective catalytic reduction, at least one measurement probe for determining an effectiveness of the configuration, and an evaluation circuit for carrying out the method according to the invention.

The evaluation circuit may typically be constructed as an integrated circuit in which the characteristic map may be stored. An evaluation circuit of that type may very easily be adapted to different exhaust systems.

With the objects of the invention in view, there is concomitantly provided a vehicle, comprising a mobile internal combustion engine, and an exhaust system according to the invention for executing the method according to the invention.

Other features which are considered as characteristic for the invention are set forth in the appended claims.

Although the invention is illustrated and described herein as embodied in a method for operating an exhaust system, an exhaust system and a vehicle having an exhaust system, it is nevertheless not intended to be limited to the details shown, since various modifications and structural changes may be made therein without departing from the spirit of the invention and within the scope and range of equivalents of the claims.

The construction and method of operation of the invention, however, together with additional exemplary embodiments, objects and advantages thereof will be best understood from the following description of specific embodiments when read in connection with the accompanying drawings, noting that the features specified therein may be combined with one another in any desired technologically expedient way.

DETAILED DESCRIPTION OF THE INVENTION

Figure 1:
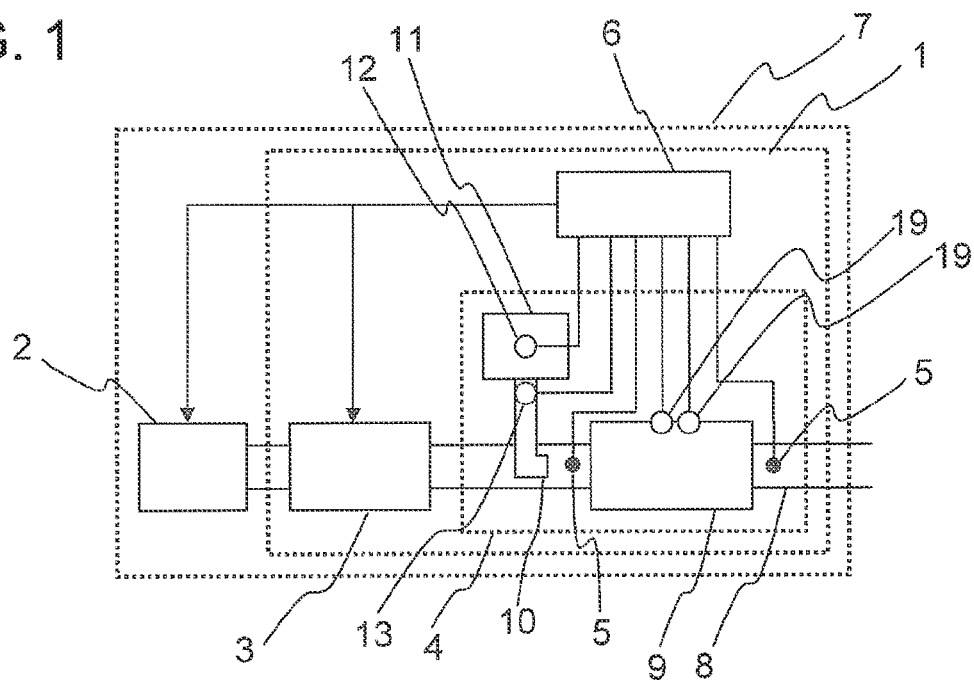
FIG. 1 is a schematic and block diagram of a motor vehicle having a structural variant of an exhaust system according to the invention.

Referring now in detail to the figures of the drawing for explaining the invention and the technical field in more detail by showing particularly preferred structural variants to which the invention is not restricted, and first, particularly, to FIG. 1 thereof, there is seen a motor vehicle 7. The motor vehicle 7 has an internal combustion engine 2 and an exhaust system 1 according to the invention. The exhaust system 1 includes an oxidation catalytic converter 3 and a configuration 4 which is suitable for a selective catalytic reduction of exhaust-gas constituents. The configuration 4 includes a supply device 10 for reducing agent or reducing agent precursor, a tank 11 for reducing agent or reducing agent precursor, an SCR catalytic converter 9 and also a measurement probe 5 in the form of a NOx sensor downstream of the SCR catalytic converter 9. The internal combustion engine 2, the oxidation catalytic converter 3, the supply system 10 and the SCR catalytic converter 9 are disposed in series in the flow direction of the exhaust gas, along an exhaust line 8. It is also optionally possible for a further measurement probe 5 to be provided upstream of the SCR catalytic converter. Furthermore, if appropriate, sensors 19 are provided which are suitable for recording different operating parameters of the configuration 4. Temperatures, pressures and/or volume flows, for example, may be determined through the use of the sensors 19. The sensors 19 may be located on different components of the configuration 4 or of the exhaust system 1. The tank 11 has a filling level sensor 12 for determining the filling level of the tank 11. Furthermore, a throughflow sensor 13 is provided which determines the reducing agent quantity supplied to the configuration 4. The operating parameters determined through the use of the measurement probes 5, the sensors 19, the filling level sensor 12 and the throughflow sensor 13 are transmitted to an evaluation circuit 6. The evaluation circuit calculates the conversion effectiveness of the oxidation catalytic converter 3 from the determined operating parameters, through an intermediate step of the conversion effectiveness of the configuration 4. The output conversion effectiveness of the oxidation catalytic converter 3 is illustrated as an arrow in FIG. 2 and may be used within the exhaust system 1 to adjust the exhaust system 1 and/or to adjust further operating parameters of the motor vehicle 7.

Figure 2:
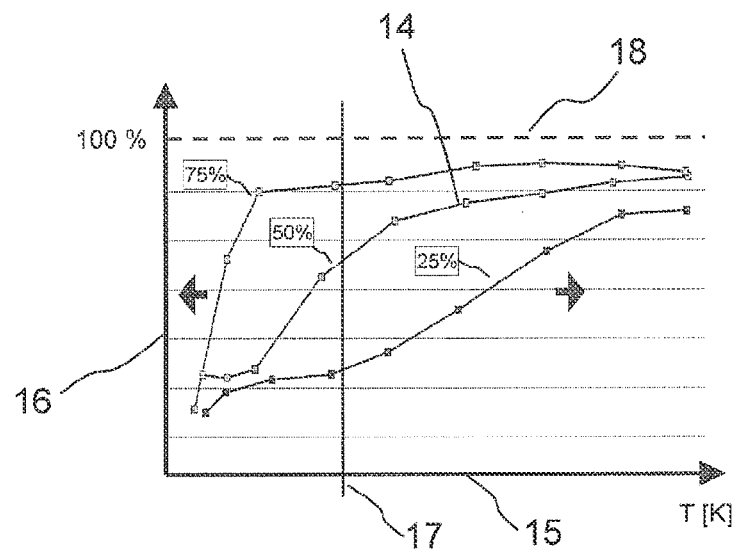
FIG. 2 illustrates an example of a characteristic map for determining nitrogen monoxide conversion in an oxidation catalytic converter.

FIG. 2 is a diagrammatic and highly simplified illustration of a characteristic map 18 which can be used to calculate the effectiveness of the nitrogen monoxide conversion of the oxidation catalytic converter. A temperature (T) of the SCR configuration is plotted on a horizontal axis 15. The conversion effectiveness of the SCR configuration is plotted on a vertical axis 16. A characteristic curve 14 illustrates the relationship between temperature and conversion effectiveness of the SCR configuration if all other influential parameters are kept constant. Further characteristic curves 14 in the characteristic map 18 show how the characteristic curve 14 is shifted if influential parameters are varied. Aside from the exhaust-gas volume flow and the reducing agent supply rate, the effectiveness of the nitrogen oxide conversion of the oxidation catalytic converter, which is positioned upstream of the SCR configuration (see FIG. 1), is one of those parameters. If the oxidation catalytic converter is particularly effective and if a large amount of nitrogen oxide is converted to nitrogen dioxide, the characteristic curve is typically shifted to the left in the direction of low temperatures. If the oxidation catalytic converter is less effective, the characteristic curve is shifted to the right in the direction of higher temperatures. If a measured temperature 17 in the SCR configuration is now determined through the use of a temperature sensor, it is possible, through the use of the conversion effectiveness of the SCR configuration on the vertical axis 16, to determine which characteristic curve 14 of the characteristic map 18 is relevant. Since each characteristic curve corresponds to a certain effectiveness of the conversion of nitrogen monoxide to form nitrogen dioxide in the oxidation catalytic converter, it is thus possible to determine the effectiveness of the conversion of nitrogen monoxide to nitrogen dioxide in the oxidation catalytic converter. Further influential variables, such as the exhaust-gas volume flow and/or the supplied reducing agent quantity, likewise cause a shift or if appropriate a deformation of the characteristic curves 14 in the characteristic map 18. Therefore, in practice, the characteristic map 18 stored in the evaluation circuit may additionally take into consideration numerous influential variables and consequently have a considerable level of complexity, but can be empirically determined in a test set-up.

Through the use of the method according to the invention, it is possible to obtain an estimation of the effectiveness of the conversion of nitrogen monoxide to nitrogen dioxide in an oxidation catalytic converter in the exhaust system, without additional measurement probes in or on the oxidation catalytic converter. This reduces the servicing frequency of the exhaust system and at the same time permits precise regulation of the overall exhaust-gas conversion.

The invention claimed is:

1. A method for operating an exhaust system of a mobile internal combustion engine, the method comprising the following steps:
   providing at least one oxidation catalytic converter in the exhaust system;
   providing at least one configuration, associated with the at least one oxidation catalytic converter, for selective catalytic reduction;
   providing at least one measurement probe, associated with the at least one configuration, for determining effectiveness of the configuration;
   a) determining a conversion effectiveness of the configuration using the at least one measurement probe; and
   b) calculating an effectiveness of nitrogen monoxide conversion in the oxidation catalytic converter from the determined conversion effectiveness by using a characteristic map of parameters influencing the conversion effectiveness of the configuration and being stored in an evaluation circuit.

2. The method for operating an exhaust system according to claim 1, which further comprises calculating a conversion effectiveness of the oxidation catalytic converter for hydrocarbons and/or for carbon monoxide from the effectiveness of the nitrogen monoxide conversion, after carrying out step b).

3. The method for operating an exhaust system according to claim 1, which further comprises measuring at least one spatial velocity and/or a volume flow of exhaust gas in the exhaust system, and incorporating the at least one spatial velocity and/or volume flow in the calculation of the effectiveness of the nitrogen monoxide conversion in the oxidation catalytic converter.

4. The method for operating an exhaust system according to claim 1, which further comprises measuring at least one temperature of exhaust gases in the exhaust system, and incorporating the at least one temperature in the calculation of the effectiveness of the nitrogen monoxide conversion in the oxidation catalytic converter.

5. The method for operating an exhaust system according to claim 1, which further comprises determining an amount of reducing agent or reducing agent precursor supplied to an exhaust gas, and incorporating the amount of reducing agent or reducing agent precursor in the calculation of the effectiveness of the nitrogen monoxide conversion in the oxidation catalytic converter.

6. An exhaust system for a mobile internal combustion engine, the exhaust system comprising:
   at least one oxidation catalystic converter;
   at least one configuration, associated with said at least one oxidation catalytic converter, for selective catalytic reduction;
   at least one measurement probe, associated with said a least one configuration, for determining an effectiveness of said configuration; and
   an evaluation circuit connected to said at least one oxidation catalytic converter, to said at least one configuration and to said at least one measurement probe, configured to carry out a method comprising the following steps:
   a) determining a conversion effectiveness of the configuration using the at least one measurement probe; and
   b) calculating an effectiveness of nitrogen monoxide conversion in the oxidation catalytic converter from the determined conversion effectiveness by using a characteristic map of parameters influencing the conversion effectiveness of the configuration and being stored in an evaluation circuit.

7. A vehicle, comprising:
   a mobile internal combustion engine; and
   an exhaust system connected to said mobile internal combustion engine, said exhaust system including:
   at least one oxidation catalytic converter;
   at least one configuration, associated with said at least one oxidation catalytic converter, for selective catalytic reduction;
   at least one measurement probe, associated with said at least one configuration, for determining an effectiveness of said configuration; and
   an evaluation circuit connected to said at least one oxidation catalytic converter, to said at least one configuration and to said at least one measurement probe, configured to carry out a method comprising the following steps:
   a) determining a conversion effectiveness of the configuration using the at least one measurement probe; and
   b) calculating an effectiveness of nitrogen monoxide conversion in the oxidation catalytic converter from the determined conversion effectiveness by using a characteristic map of parameters influencing the conversion effectiveness of the configuration and being stored in an evaluation circuit.

* * * * *